United States Patent [19]

Hars et al.

[11] Patent Number: 4,857,207

[45] Date of Patent: Aug. 15, 1989

[54] PROCESS FOR REDUCING THE PHENOL CONTENT IN PHENOL-CONTAINING WATERS

[75] Inventors: Ulrich Hars, Dassendorf; Rolf Staiger, Hoisdorf; Karl Westphal, Hamburg, all of Fed. Rep. of Germany

[73] Assignee: Hoechst AG, Fed. Rep. of Germany

[21] Appl. No.: 179,473

[22] Filed: Apr. 8, 1988

[30] Foreign Application Priority Data

Apr. 11, 1987 [DE] Fed. Rep. of Germany ....... 3712362

[51] Int. Cl.$^4$ .............................................. C02F 1/52
[52] U.S. Cl. ................................... 210/725; 210/729; 210/737; 210/909; 528/147
[58] Field of Search ............... 210/725, 729, 737, 909, 210/727, 728; 528/147

[56] References Cited

U.S. PATENT DOCUMENTS

| 1,187,229 | 6/1916 | Baekeland | 528/147 |
| 3,869,387 | 3/1975 | Vargiu et al. | 210/725 |
| 4,198,499 | 4/1980 | Konii | 528/147 |
| 4,216,088 | 8/1980 | Juferov et al. | 210/909 |
| 4,454,298 | 6/1984 | Koyama et al. | 528/147 |

FOREIGN PATENT DOCUMENTS 58-104688  6/1983  Japan .................... 210/909

Primary Examiner—Peter Hruskoci
Attorney, Agent, or Firm—Bierman and Muserlian

[57] ABSTRACT

A process for the purification of phenol-containing waters, in particular waste waters from phenolic resin production, where the term "phenol" is taken to mean all steam-volatile benzene derivatives according to DIN 38,409 H 16, by reaction of the phenol with formaldehyde in an alkaline environment at 50° to 100° C. to form those phenolformaldehyde condensates which, by subsequent acidification of the waste water, precipitate in filterable, granular and no longer sticky form and can be separated.

4 Claims, 1 Drawing Sheet

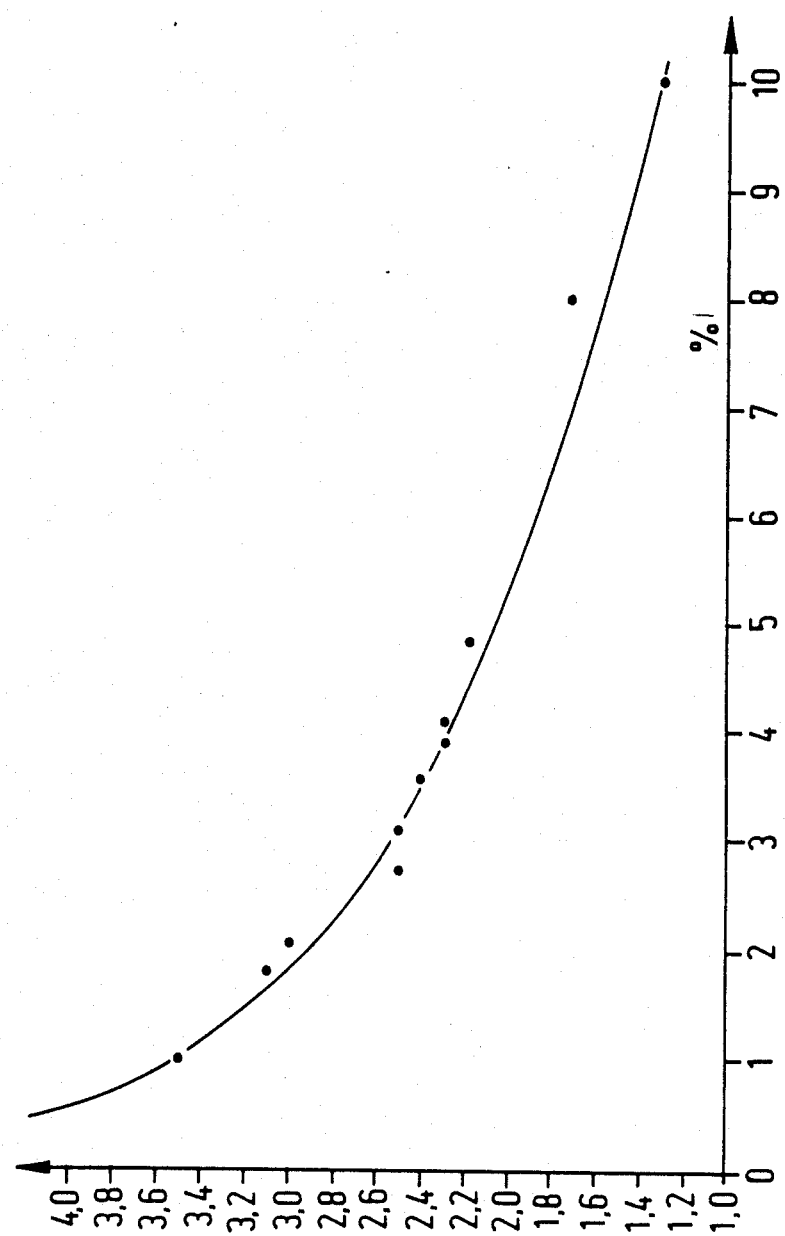

PROCESS FOR REDUCING THE PHENOL CONTENT IN PHENOL-CONTAINING WATERS

In the production of phenolic resins, waste water is produced which frequently contains considerable amounts of free phenols and which heavily loads the clarification plants and receiving watercourses, even when it is diluted with phenol-free waters to the extent that the phenol content is below the permitted limits for introduction. Besides, dilution is not universally possible neither does it alter the absolute amount of free phenol which is passed into the environment. On account of the harmfulness of phenols, this amount should be kept as small as possible, so that there is great interest in reducing the phenol load in waste waters as extensively as possible. The term "phenol" is taken here and in the following to mean all steam-volatile hydroxyl-containing benzene derivatives according to DIN 38,409 H 16.

According to the invention, the content of free phenols in waters, in particular waste waters, can be considerably reduced when formaldehyde is added to the phenolcontaining water, the treated water is warmed in the alkaline pH region to a temperature of 50°–100° C. until acidification of a sample forms a filterable precipitate, and the treated water is then acidified.

Preferably, the pH during the treatment should be at least 11. Sufficient alkali metal hydroxide is expediently added to the water to be treated so that 1 mole of alkali metal hydroxide is present per mole of phenolic hydroxyl groups. As a rule, sodium hydroxide is used on cost grounds.

For acidification of the treated water, any strong acid can be used, for example hydrochloric acid, sulfuric acid or phosphoric acid, or an organic acid, such as, for example, formic acid.

BRIEF DESCRIPTION OF THE DRAWING

FIG. 1 shows a plot of the phenol/formaldehyde loading ratio used in the instant process. The higher the content of free phenol in the water, the smaller can be the required amount of formaldehyde added. Provided that the water already contains formaldehyde in addition to phenol, as is often the case in waste waters from phenolic resin production, this existing formaldehyde is taken into account. The following Table I, Series A and FIG. 1 show the phenol/formaldehyde ratio.

TABLE I

| | Initial concentrations | | Condensation conditions | | | Final concentrations | |
|---|---|---|---|---|---|---|---|
| | Phenol content % | Formaldehyde % | Loading | Temperature °C. | Time h | Phenol mg/l | Formaldehyde mg/l |
| Series A | 0.3 | 0.04 | 1:4.5 | 85 | 12 | 76 | 500 |
| | 1.0 | 0.23 | 1:3.5 | 85 | 9 | 10 | 300 |
| | 1.8 | 0.42 | 1:3.1 | 85 | 8 | 34 | 100 |
| | 2.0 | 0.40 | 1:3.0 | 85 | 8 | 56 | 400 |
| | 2.7 | 0.47 | 1:2.5 | 85 | 7 | 84 | 300 |
| | 3.0 | 0.41 | 1:2.5 | 85 | 7 | 10 | 300 |
| | 3.5 | 0.89 | 1:2.4 | 85 | 7 | 72 | 600 |
| | 3.8 | 0.74 | 1:2.3 | 85 | 5 | 14 | 500 |
| | 4.0 | 0.95 | 1:2.3 | 85 | 5 | 57 | 500 |
| | 4.7 | 0.70 | 1:2.3 | 85 | 5 | 73 | 600 |
| | 8.0 | 0.44 | 1:1.7 | 85 | 4 | 81 | 600 |
| | 10.0 | 0.37 | 1:1.3 | 85 | 4 | 97 | 500 |
| Series B | 3.0 | 0.41 | 1:2.5 | 98 | 2 | 83 | 400 |
| | 3.0 | 0.41 | 1:2.5 | 85 | 7 | 10 | 300 |
| | 3.0 | 0.72 | 1:2.5 | 80 | 9 | 49 | 400 |
| | 3.0 | 0.54 | 1:2.5 | 75 | 13 | 54 | 500 |
| | 3.0 | 0.54 | 1:2.5 | 70 | 15 | 87 | 400 |
| | 3.0 | 0.54 | 1:2.5 | 60 | 20 | 54 | 700 |

At the same starting concentration of phenol and the same molar ratio of phenol : formaldehyde, the reaction time which is necessary in order that a readily-decantable or filterable concentrate is obtained on acidification of the reaction mixture, depends upon the reaction temperature. Table I, series B provides information.

As can be inferred from Table I, the process can be optimized according to various viewpoints, according to whether particularly low residual phenol contents, particularly short reaction times or a favorable energy consumption are desired.

Table II shows the course of the condensation based on the consistency of the precipitated condensate by example of a waste water having a phenol content of 3% phenol at a phenol : formaldehyde ratio = 1:2.5 (molar) and a reaction and acidification temperature of 85° C.

TABLE II

| Reaction time (h) | Consistency |
|---|---|
| 1 | Drops, liquid |
| 2 | ditto |
| 3 | ditto |
| 4 | Lumps, sticky |
| 5 | ditto |
| 6 | Coarse-grained, slightly sticky |
| 7 | Fine-grained, non-sticky, well filterable |
| 7.5 | Very fine-grained, poor separation |
| 8 | Suspension, no separation |

The point at which the treated water is acidified for the precipitation of the phenol/formaldehyde condensate must in each case be determined for the existing ratios. Depending on the degree of condensation and temperature in the precipitation, the condensate is produced in the form of drops or lumps or as coarse or fine-grained material. For decantation or filtration, a precipitate which has a relatively coarse grain and does not stick is convenient. If the treatment is continued beyond this point, then a very fine precipitate results, which cannot be decanted and can only be filtered with difficulty.

We claim:
1. A process for reducing the phenol content in phenol-containing waters comprising adding formaldehyde and sufficient alkali metal hydroxide to the phenol-containing water, wherein at least 1 mole of alkali metal hydroxide is present per mole of phenolic hydroxyl groups, warming the treated water in the alkaline pH region to a temperature of 50° to 100° C. until acidification of a sample of said treated water forms a filterable precipitate of phenol formaldehyde condensate, acidifying the treated water at said temperature to form said filterable precipitate, and separating said filterable precipitate from the water.

2. The process as claimed in claim 1, wherein the warning treatment is performed at a pH of at least 11.

3. The process as claimed in claim 1, wherein, the formaldehyde is added in a molar ratio of phenol: formaldehyde of 1:1.3 to 1:4.5.

4. The process of claim 1 wherein the phenol-containing water is waste water.

* * * * *